Sept. 18, 1945.   F. L. ALBEN ET AL   2,384,785
RAILWAY VEHICLE TRUCK
Original Filed May 14, 1941   2 Sheets-Sheet 1

WITNESSES:

INVENTORS
Frank L. Alben &
Bernard F. Langer
BY
ATTORNEY

Sept. 18, 1945.    F. L. ALBEN ET AL    2,384,785
RAILWAY VEHICLE TRUCK
Original Filed May 14, 1941    2 Sheets-Sheet 2
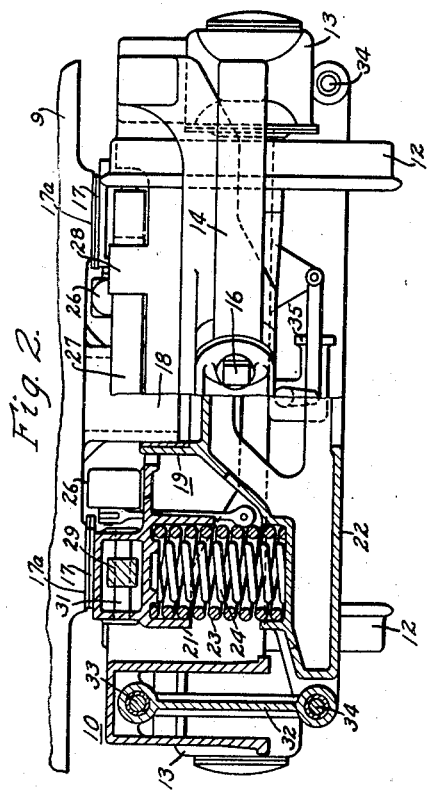
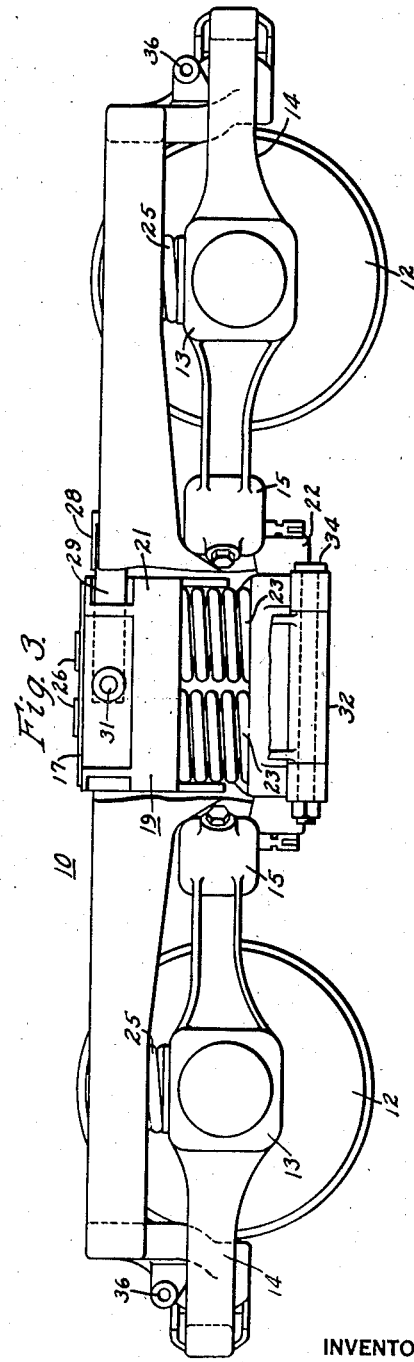
INVENTORS
Frank L. Alben &
Bernard F. Langer Patented Sept. 18, 1945

2,384,785

UNITED STATES PATENT OFFICE 2,384,785

RAILWAY VEHICLE TRUCK

Frank L. Alben and Bernard F. Langer, Pittsburgh, Pa., assignors to Westinghouse Electric Corporation, East Pittsburgh, Pa., a corporation of Pennsylvania Original application May 14, 1941, Serial No. 393,328. Divided and this application October 22, 1943, Serial No. 507,260

4 Claims. (Cl. 105—190)

This application is a division of our copending application Serial No. 393,328, filed May 14, 1941.

Our invention relates, generally, to truck structures and, more particularly, to trucks for railway vehicles.

An object of our invention, generally stated, is to provide a railway vehicle truck structure which shall be simple and efficient in operation and which may be economically manufactured.

A more specific object of our invention is to improve the riding qualities of a railway vehicle truck.

Another object of our invention is to reduce the parts of a vehicle truck which are subject to wear.

A further object of our invention is to provide in a vehicle truck for a large amount of vertical and lateral flexibility between the car and the axles.

Still another object of our invention is to provide suitable damping in a vehicle truck in parallel with the vertical and lateral flexibilities thereof to impede free oscillations of the car body supported by the truck.

A still further object of our invention is to prevent nosing oscillations of a vehicle truck during operation of the vehicle.

Another object of our invention is to provide sufficient lateral stability in a vehicle truck that the car body will not lean at an uncomfortable angle when rounding a curve at high speed.

Other objects of our invention will be explained fully hereinafter or will be apparent to those skilled in the art.

According to one embodiment of our invention, each journal box of a four-wheel truck is mounted rigidly in its own subframe, which is hinged to the main truck frame at two points and the small motion at these hinge points is taken by the deflection of rubber bushings. The weight of the car body is supported on loading pads spaced a sufficient distance apart to introduce frictional restraint to nosing oscillations. The vertical spring system comprises flexible helical springs between the upper and lower portions of the bolster and comparatively stiff helical springs between the axle bearings and the main truck frame. A ride stabilizer is provided to prevent excessive leaning of the car body on curves. Lateral flexibility of the truck is obtained by supporting the bolster in the main truck frame by means of vertical swing hangers, and both lateral and vertical motions are damped by shock absorbers.

For a fuller understanding of the nature and objects of our invention, reference may be had to the following detailed description taken in conjunction with the accompanying drawings, in which:

Fig. 2 is a view, partially in section and partially in end elevation, taken along the line II—II of Fig. 1, and Fig. 3 is a view, in side elevation of the truck structure shown in Fig. 1, a portion of the main frame being broken away.

Figure 1:
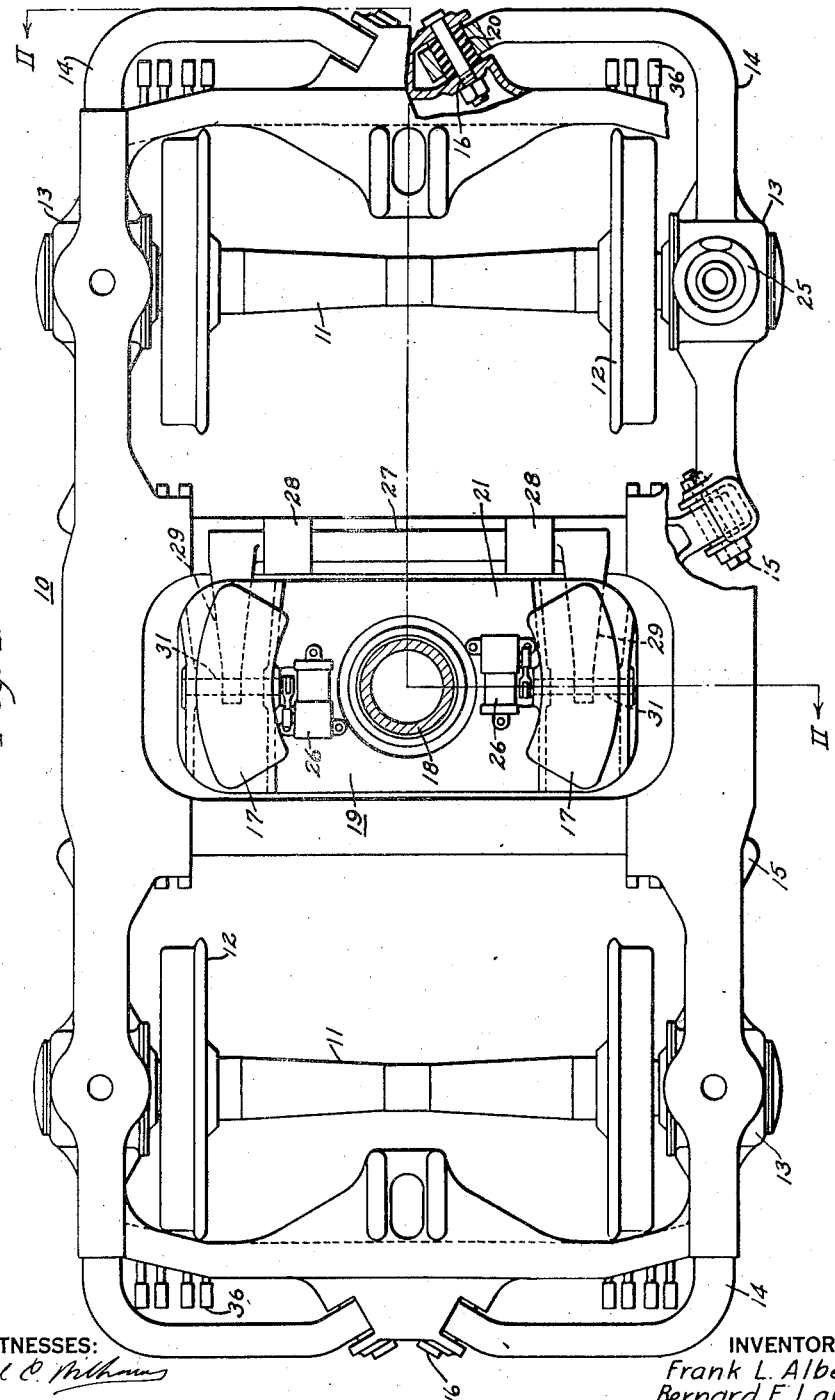
Figure 1 is a view, in plan, of a railway vehicle truck embodying our invention, certain portions being broken away for clearness.

Referring to the drawings and particularly to Fig. 1, the vehicle truck structure shown therein comprises a main frame 10 which is supported by axles 11 and wheels 12 of the conventional type. The axles 11 run in self-aligning antifriction bearings which are disposed in journal boxes 13. Each journal box 13 is mounted rigidly in its own subframe 14 which is hinged to the main frame 10 at two points 15 and 16, thereby permitting a limited amount of vertical movement of the journal box relative to the main frame. The small motion at the hinge points 15 and 16 may be taken by the deflection of rubber bushings 20, thereby eliminating wear.

In order to restrain nosing oscillations of the truck, the weight of the car body 9, only a portion of which is shown in Fig. 2, is supported on a pair of loading pads 17 which are disposed on opposite sides of a center pin 18 and spaced a considerable distance from the center pin. Loading pads 17a are provided on the car body 9 and rest on the pads 17 on the truck. The loading pads 17 and the center pin 18 are carried by a swing bolster 19 which is divided into an upper section 21 and a lower section 22, as shown more clearly in Fig. 2. Since the weight of the car body is supported by the loading pads 17 and not by the center pin 18, as is the usual arrangement, frictional restraint to nosing oscillations is introduced by means of the loading pads 17. The center pin 18 transmits horizontal and tractional forces only and does not oppose rotation about any axis.

As shown in Figs. 2 and 3, the vertical spring system comprises flexible helical springs 23 and 24, disposed between the upper and lower portions of the bolster 19, and comparatively stiff helical springs 25, disposed between the journal boxes 13 and the main frame 10. As explained hereinbefore, the journal boxes 13 are rigidly mounted in the subframes 14 which are hinged to the main frame 10. As shown in Fig. 2, the springs 24 may be disposed inside the springs 23. The springs are all of the helical type, thereby eliminating friction in the spring system.

In order to damp the vertical movement of the upper section 21 of the bolster relative to the lower section 22, shock absorbers 26 are connected between the upper and the lower sections of the bolster. The shock absorbers 26 are preferably of the hydraulic, inertia controlled type, however, shock absorbers of other types may be utilized if desired.

In order to prevent an excessive amount of leaning of the car body on curves resulting from the use of flexible springs, a ride stabilizer bar 27 is provided. As shown in Fig. 1, the stabilizer bar 27 is rotatably mounted in bearings 28 on the main frame 10 and is connected to the upper part 21 of the bolster 19 by arms 29, one of which is at each end of the bar 27. The arms 29 are rotatably connected to the bolster 19 by means of pins 31 rotatably mounted in the upper section 21 of the bolster underneath the loading pads 17. Thus, it will be seen that, for vertical motion of the truck relative to the car the bar 27 rotates freely in its bearings. However, for rolling or tilting motion of the car body the bar 27 must twist. In this manner excessive rolling or tilting of the car body on curves is prevented.

The lateral flexibility of the truck is obtained by supporting the bolster 19 in the main frame by means of long vertical swing hangers 32, as shown best in Fig. 2. The upper end of each hanger 32 is rotatably connected to the main frame 10 by means of a bolt 33 and the lower end is rotatably connected to the lower section 22 of the bolster by means of a bolt 34.

As shown, the hangers 32 are of the shackle type, that is, they are in one piece and long in the longitudinal direction in order that they can transmit longitudinal forces from the bolster to the main frame. In this manner the need for a sliding surface to transmit tractive forces to and from the truck frame is eliminated. Furthermore, by mounting the swing hangers vertically, maximum lateral flexibility is obtained. The lateral motions of the bolster are damped by shock absorbers 35 connected between the main frame 10 and the lower section 22 of the bolster, as shown in Fig. 2.

The main frame 10 is also provided with a plurality of arms 36 for mounting a suitable brake rigging on the truck. Since the brake rigging forms no part of the present invention, it has been omitted from the drawings in order to avoid unduly complicating the structure illustrated.

From the foregoing description, it is apparent that we have devised a truck structure which provides vertical flexibility by means of helical springs and lateral flexibility by means of vertical swing hangers. The best type of damping of the vertical and lateral movements is provided, since the friction of leaf springs is eliminated and hydraulic shock absorbers are utilized.

Furthermore, the present structure provides a means for preventing nosing oscillations of the truck through pads located at a considerable distance from each other, thus affording more frictional resistance to truck swiveling than does the conventional center pin. A lateral stabilizer, which resists the objectionable tilting produced by centrifugal force on curves is also provided.

The present structure eliminates some parts of the conventional truck which ordinarily wear in such a way as to impair the riding qualities of the truck. These parts are the journal boxes which usually slide up and down in perpendicular guides and which are replaced in the present structure by boxes rigidly mounted in auxiliary frames hinged to the main truck frame. Also, the transmission of longitudinal forces from the swing bolster to the truck frame is accomplished by means of shackle type links which eliminate the need for direct contact between the swing bolster and the truck transom.

The combination of the soft springs, the lateral stabilizer and the swing links is of particular importance because no one or two of these features could produce good riding qualities without the third. The soft springs alone provide vertical and some lateral flexibility but allow tilting on curves. The ride stabilizer eliminates the objectionable tilting but also reduces the lateral flexibility. The swing links provide lateral flexibility. Thus, if all three features are used, all the desirable results are obtained and the undesirable ones are eliminated.

Since numerous changes may be made in the above described construction, and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. In a railway vehicle truck for supporting a car body, in combination, a truck frame, a swing bolster mounted in said frame, said bolster comprising an upper section and a lower section, a center pin disposed in the lower section, loading pads disposed on the upper section on opposite sides of the center pin to support the car body, helical springs interposed between said sections, and swing hangers for connecting the lower section to the truck frame.

2. In a railway vehicle truck for supporting a car body, in combination, a truck frame, a swing bolster mounted in said frame, said bolster comprising an upper section and a lower section, a center pin disposed in the lower section, loading pads disposed on the upper section on opposite sides of the center pin to support the car body, helical springs interposed between said sections, and vertically disposed swing hangers for connecting the lower section to the truck frame, said swing hangers being disposed to permit lateral movement of the bolster in the truck frame and prevent longitudinal movement of the bolster with respect to the truck frame.

3. In a railway vehicle truck for supporting a car body, in combination, a truck frame, a swing bolster mounted in said frame, said bolster comprising an upper section and a lower section, a center pin disposed in the lower section, loading pads disposed on the upper section on opposite sides of the center pin to support the car body, helical springs interposed between said sections, and vertically disposed swing hangers for connecting the lower section of the truck frame, said swing hangers being disposed to permit lateral movement of the bolster in the truck frame and prevent longitudinal movement of the bolster with respect to the truck frame, and shock absorbers connected between the bolster and the truck frame to damp the lateral movement of the bolster.

4. In a railway vehicle truck for supporting a car body, in combination, a truck frame, a swing bolster mounted in said frame, said bolster comprising an upper section and a lower section, a center pin disposed in the lower section, loading pads disposed on the upper section on opposite sides of the center pin to support the car body, helical springs interposed between said sections, and shock absorbers connected between the upper and the lower sections to damp the vertical movement of the upper section.

FRANK L. ALBEN.
BERNARD F. LANGER.